United States Patent Office 3,005,185
Patented Oct. 17, 1961

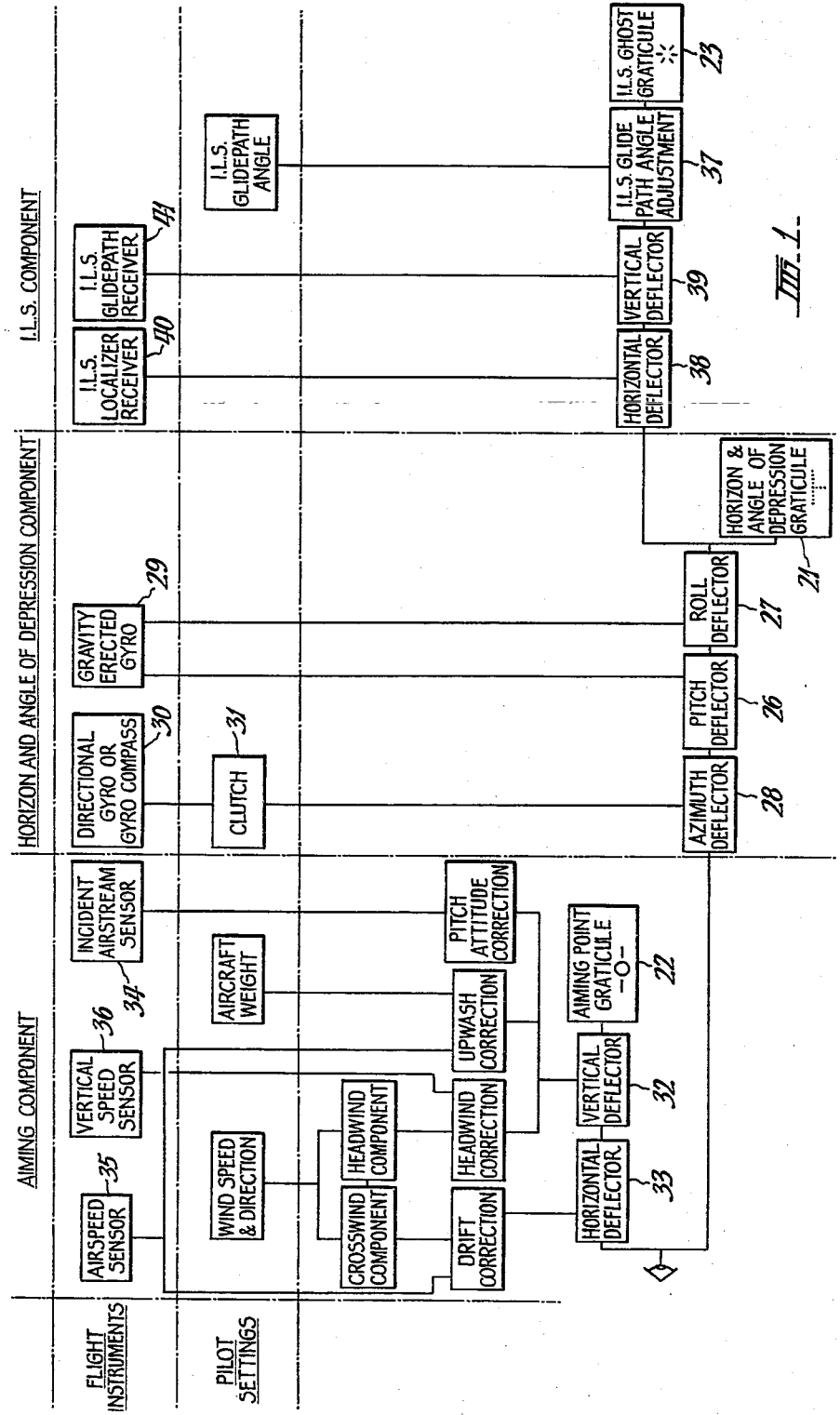

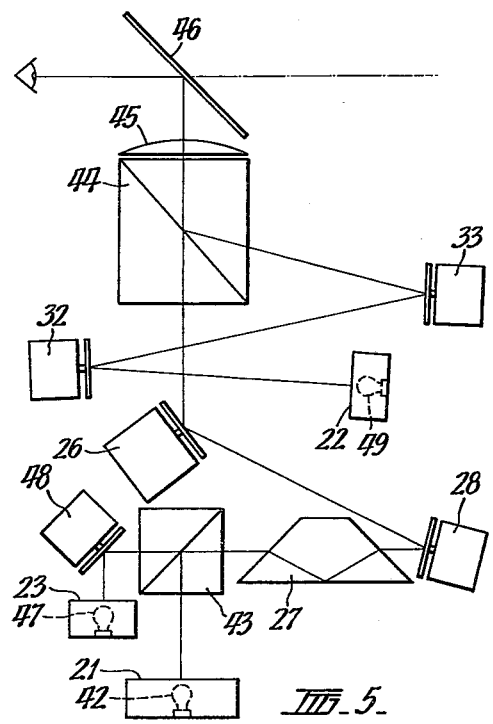

3,005,185
AIRBORNE APPROACH AID
Ronald William Cumming, Brighton, Victoria, and John Charles Lane, Camberwell, Victoria, Australia, assignors to Commonwealth of Australia, Canberra, Australia
Filed June 24, 1957, Ser. No. 667,644
Claims priority, application Australia July 4, 1956
4 Claims. (Cl. 340—27)

This invention relates to an airborne approach aid and is concerned more particularly with means for inclusion in an aircraft to assist the pilot in bringing the aircraft in to land.

It is the practice at the present time to provide aircraft control panels with instruments for giving pilots information to assist them in bringing the aircraft in to land. However the present equipment for this purpose is not completely satisfactory for all circumstances, and there is a need for additional means to aid a pilot in landing, which means will dispense with or reduce the critical judgment required by the pilot.

The object of this invention is to provide such additional means and with this object in view the present invention broadly resides in the provision of means for displaying information superimposed on the external scene, directly in the pilot's normal field of vision.

According to one aspect of the invention the information displayed may comprise a horizontal line representing the horizon and a scale below the horizon of angles subtended at the pilot's eye.

According to another aspect of the invention the information displayed may comprise an indication of the instantaneous direction of the flight path of the aircraft.

According to a further aspect of the invention the display may include information to show the position of the aircraft in relation to the I.L.S. (instrument landing system) beams or other radio beams.

More particularly an airborne approach aid according to this invention may comprise means for providing directly in the pilot's normal field of vision and superimposed on the external scene, three separate displays giving the position of the aircraft relative to the horizon and in azimuth, the position of the aircraft relative to the I.L.S. beams or other radio beams and the instantaneous direction of the flight path of the aircraft.

A feature of the invention resides in the fact that the display is arranged directly in the pilot's vision and superimposed on the external scene, whereby the pilot is not required continually to transfer his attention between the instrument panel and the external scene at critical periods.

A further feature of the invention is that the approach aid is suitable for use by day or night and in any type of visibility and that it does not involve the use of alternative drill or procedure dependent upon external conditions.

Other features of the invention will be evident from the ensuing description of a preferred form of the invention.

In this description reference is made to the accompanying drawings wherein:

FIGURE 1 is a block diagram of an airborne approach aid according to the invention, illustrating the nature of the information supplied thereto, FIGURES 2, 3 and 4 are views showing separately the three visual images presented to the eye of a pilot by the approach aid of FIGURE 1, FIGURE 5 is a schematic view of an optical arrangement of the approach aid illustrated by FIGURE 1, and FIGURES 6 to 11 inclusive are views illustrating the visual display which may be presented to the pilot of an aircraft equipped with the approach aid of FIGURES 1 to 5, during its approach to land.

In the drawings the same reference numerals are used to refer to like or corresponding parts.

The airborne approach aid illustrated by the block diagram of FIGURE 1 is arranged to provide three visual displays, which are superimposed on the external scene directly in the normal field of vision of the pilot of an aircraft fitted with the aid, by reflecting images of three illuminated graticules 21, 22 and 23 which images are focused at infinity ahead of the pilot. The image from the graticule 21 is devised to give the position of the aircraft relative to the horizon and in azimuth, that from the graticule 22 is devised to give an aiming point, i.e. the instantaneous direction of the flight path of the aircraft relative to the ground, and that from the graticule 23 is devised to give the position of the aircraft relative to the I.L.S. beams (or other radio beams). The means whereby these positions are given are hereinafter described. In FIGURE 1, the various flight instruments required for providing information are set out in a horizontal line against the indication "Flight Instruments." Below this line the various additional information which the pilot or other crew member is required to set in to the equipment is set out in a second line against the indication "Pilot Settings." Below this line the correction factors derived from this information are illustrated, and below this again is shown the integers of the optical system of the equipment comprising the graticules, and deflectors controlled by the flight instruments and pilot's settings. The portion of equipment providing the display which shows the position relative to the horizon and in azimuth is grouped centrally in the diagram of FIGURE 1 under the heading "Horizon and Angle of Depression Component," the portion providing the aiming point display is grouped to the left under the heading "Aiming Component" and the portion providing the display for giving the position of the aircraft relative to the I.L.S. beams is grouped to the right under the heading "I.L.S. Component."

The graticule 21 is preferably such as to provide the image illustrated in FIGURE 2, comprising a horizontal line of dots 24 with a vertical line of dots 25 extending downwardly therefrom, the dots 25 on the vertical line representing degrees of angle subtended at the pilot's eye. The dots 24 may also be spaced so that they are 1° apart. The fifth dot from the centre point in each direction may be identified by the numeral "5" as shown and they may be of two different sizes, larger dots alternating with smaller dots, to assist the pilot in reading the scales. In order that the image of the graticule 21 may be stabilised against pitching, rolling and yawing movement of the aircraft deflector devices 26, 27 and 28 are disposed in the optical path between the graticule 21 and the pilot's eye. The devices 26 and 27 are provided to stabilise the image against pitching and rolling movement respectively, while the device 28 is provided for azimuth stabilisation. The particular order of these devices in the optical path is not important. The deflector devices 26 and 27 are preferably controlled from the gravity erected gyro 29 included as one of the normal flight instruments of the aircraft. This control may be effected electrically or mechanically. The deflector device 28 for azimuth stabilisation is controlled from the direction gyro or gyro compass 30 included as one of the normal instruments of the aircraft. The control is effected by electrical or mechanical means and a clutch or equivalent device 31 is provided to enable the pilot to uncage the deflector and couple it to the gyro or vice versa, at will.

The graticule 22 is preferably such that the image which it presents is a circle with two horizontal lines in line with its centre as shown in FIGURE 3, or other means whereby any roll deviation of the aircraft is indicated. Controls are provided to ensure that a line from the pilot's eye to the centre of this image is the flight path of the aircraft relative to the ground at any instant, such controls operating either one of a vertical deflector 32 and a horizontal deflector 33 disposed in the optical path between the graticule 22 and the pilot's eye. The controls are preferably effected electrically.

Movement in elevation, i.e. the angle of the flight path relative to the longitudinal axis of the aircraft depends upon the following factors:
 (a) The aircraft incidence relative to the airstream,
 (b) The equivalent airspeed,
 (c) The aircraft weight, and
 (d) Headwind correction.

The aircraft incidence relative to the airstream is measured by an incident airstream sensor, i.e. sensing device, 34 which is one of the flight instruments. This device may comprise a vane or a self-balancing slotted rotating probe. Such a probe is described in an article entitled "Navy Buys Angle-of-Attack Unit" appearing in "Aviation Week" for August 18, 1952, page 49. The output of this device is electrical, by potentiometers, and provides a pitch attitude correction which is applied to the vertical deflector 32.

The equivalent airspeed is measured by an airspeed sensor 35 forming one of the flight instruments. The output from this instrument is combined with a factor determined according to the aircraft weight, which the pilot or other crew member sets in manually, and the combination provides an upwash correction which is also applied to the vertical deflector 32.

Headwind correction depends upon the headwind component of the wind, the angle of depression of the flight path and the true airspeed, i.e. upon the headwind component and the rate of descent. Rate of descent is obtained from a rate of climb indicator i.e., vertical speed sensor 36, forming one of the flight instruments. The output from this device is combined with the headwind component which is derived by setting in the wind speed and direction. The combined output provides the headwind correction which is also applied to the vertical deflector 32.

Movement in azimuth depends upon the true airspeed and the crosswind component. The former is derived from the airspeed sensor the output from which is combined with the crosswind component which is derived, in common with the headwind component, by setting in the wind speed and direction. The combined output provides the drift correction which is applied to the horizontal deflector 33.

The graticule 23 is preferably such as to provide an image in the form of a circle of radial lines as shown in FIGURE 4, thus giving the appearance of a dotted or "ghost" circle. The light path from the graticule 23 to the pilot's eye passes through the pitch deflector 26, the roll deflector 27 and the azimuth deflector 28 so that the image of the graticule 23 is subject to the same stabilising influence as the image of the graticule 21, and would remain concentric with a datum point thereon which is normally about the 3° mark on the line of dots 25, if it were not for additional influences. These additional influences are provided by an I.L.S. glide path angle adjustment 37, a further horizontal deflector 38, and a further vertical deflector 39. Since I.L.S. glide path angles are not standardized it is necessary to provide the pilot with a control to adjust the datum point relative to the vertical scale of the image of the graticule 21 to coincide with the local I.L.S. angle. The I.L.S. glide path adjustment 37 is provided for this purpose and may function electrically in conjunction with the vertical deflector 39. The horizontal deflector 38 and the vertical deflector 39 are controlled respectively by the I.L.S. localizer receiver 40 and the I.L.S. glide path receiver 41, carried by the aircraft as normal flight instruments. In the usual arrangement of I.L.S. indicator as used in aircraft at present there are two intersecting needles, one movable vertically and controlled by the glide path receiver and the other movable horizontally and controlled by the localizer receiver. The direction of the point of intersection of the needles from the centre position thus indicates the direction towards which the aircraft is required to move in order to be on the glide path. The aircraft may or may not be already directed in the required direction and the pilot is required to carry out a mental differentiation in order to determine this and finally to place the aircraft in the glide path and have it flying in the appropriate direction to remain in the glide path. In the arrangement according to this invention the connections to the deflectors 38 and 39 are such that the movements of the image of the graticule 23 from the datum point on the image of the graticule 21, in both glide path and azimuth, are in the same sense as the movement of the intersection of the conventional I.L.S. glide path and localizer needles. Thus the direction of the centre of the image of the graticule 23 from the datum point indicates the direction of the location of the beam in relation to the aircraft. Accordingly the pilot can direct the aircraft towards the I.L.S. beam by bringing the image of the aiming point graticule 22 so as to be concentric with that of the I.L.S. graticule 23. The gains can be readily designed so that this operation will result in the aircraft following a suitable closing course onto the I.L.S. beam. As the aircraft approaches the beam the I.L.S. graticule image will approach its datum position so that if the pilot continues to follow it with the aiming graticule image the aircraft automatically executes a gradually closing course onto the beam.

The approach aid has so far been described with reference only to the block diagram of FIGURE 1 and the preferred graticule images portrayed in FIGURES 2, 3 and 4. FIGURE 5 illustrates schematically a suitable optical arrangement. In this arrangement the graticule 21 is illuminated by a lamp 42 and the beam therefrom passes vertically upwards (taking the aircraft as being on level flight with zero incidence) into a beam mixer 43. The beam is reflected from the mixer 43 through the roll deflector 27, here depicted as a Dove prism, to the azimuth deflector 28, here depicted as a tilting mirror device. The beam is deflected with an upward inclination towards the pitch deflector 26 shown as a second tilting mirror device, directly above the beam mixer 43. From here the beam extends vertically upwardly through a second beam mixer 44 and a collimating lens 45 to a reflector plate 46, which may be the aircraft windscreen or an auxiliary glass plate, disposed at 45° to the vertical. The beam is thus deflected horizontally to the pilot's eye as shown, with the result that the image appears to the pilot to be located in space directly in front of him.

The I.L.S. graticule 23 is disposed horizontally to one side of the graticule 21 and is illuminated by a lamp 47. The beam from the graticule 23 passes vertically upwards to the mirror of a tilting device 48, which combines in one device the adjustment 37 and the deflectors 38 and 39, its mirror being tiltable about two perpendicular axes. The beam then passes horizontally through the beam mixer 43 and thereafter follows the same path to the pilot's eye as the beam from the graticule 21.

The aiming point graticule 22 is disposed forwardly of and below the level of the beam mixer 44 and is slightly inclined so that the beam passing through it from its lamp 49 is tilted slightly upwardly. The beam strikes the mirror of the vertical deflector 32, and is then reflected forwardly to the mirror of the horizontal deflector 33. It is then reflected rearwardly again into the beam mixer 44 wherein it is reflected vertically upwardly to the reflector plate 46 and thence to the pilot's eye.

It should be noted that the three beams should all be equal to the focal length of the collimating lens 45.

In addition to the pilot settings shown in FIGURE 1, controls should be provided for switching the three components of the visual display in or out, particularly the I.L.S. component, and for controlling the brightness of the images.

In operation under full visual conditions the I.L.S. component is not required and is switched off so that the image of the graticule 23 is not visible to the pilot. On a straight-in approach, or after a circuit on the approach leg the pilot engages the clutch 31 when his heading is parallel to the runway axis, and thus stabilises the vertical line of the image of the graticule 21 in azimuth. The horizontal line of the image of the graticule 21 is then coincident with the horizon and the runway is seen slightly below the horizon on the vertical line of dots. While still flying horizontally the centre of the image of the aiming point graticule 22 is coincident with the zero point of the image of the graticule 21 and the visual display is then as shown in FIGURE 6, the runway being denoted by "R." The pilot continues to hold this heading and as the aircraft approaches the runway the aiming point P on the runway becomes discernable and moves down the scale of dots 25 until it reaches the required angle of depression for the glide path desired. FIGURE 7 of the drawings illustrates the visual display when this stage is reached, the angle of depression in this case being 2½°. The pilot then initiates the descent by controlling the aircraft to move the image of the graticule 22 down so that it encircles the runway aiming point P as shown in FIGURE 8. He then concentrates on keeping the aiming circle over the runway aiming point irrespective of possible slight changes of reading on the angle of depression scale, i.e. small changes in the glide path angle, which might occur due to wind or other factors. Throughout the approach the presence of the image of the artificial horizon gives the pilot a visual reference for roll and pitch control even if the natural horizon is obscured by obstructions or by poor visibility. Moreover while the pilot is concentrating mainly on aiming the aiming circle at the aiming point on the runway he has always before him continuous information on his glide path angle, by reference to the angle of depression scale.

In operation under instrument flying conditions, it is intended that the pilot will fly the horizontal approach and initiate final approach by current conventional methods using standard I.L.S. instruments on the control panel. However before initiating the final approach the pilot should set the glide path angle adjustment 37 to the appropriate glide path angle (here taken as being 2½°) and should switch on the I.L.S. component of the approach aid. The visual display before him is then as shown in FIGURE 9, the ghost circle formed by the image of the graticule 23 being at its upper limit of movement in which it happens to be concentric with the zero point of the angle of depression scale. As the aircraft approaches the I.L.S. beam the ghost circle moves down the scale reaching the datum point, i.e. the 2½° position, as the aircraft reaches the centre of the beam. If the aircraft is maintained in level flight the visual display is then as shown in FIGURE 10, and the aircraft controls can then be operated to bring the aiming circle into concentricity with the ghost circle as shown in FIGURE 11, thereby causing the aircraft to fly down the glide path. Alternatively, and preferably, throughout the period in which the ghost circle moves down from the zero point to the 2½° point the pilot may manipulate the controls to cause the aiming circle to follow the ghost circle. In this case the aircraft describes a curved path which closes tangentially with the I.L.S. beam.

The ratio of I.L.S. ghost circle movement to aircraft displacement from the beam is so arranged that, even if the aircraft drifts from the beam, by maintaining coincidence between the aiming and ghost circles the pilot is automatically directed onto the optimum flight path to return to the beam. He is thus enabled to follow the I.L.S. beam down to near the ground without having to make mental computations as to the corrections to apply.

When the aircraft breaks cloud and the aiming point of the runway comes into view it will appear within the two circles upon which the pilot has been concentrating. He is thus spared the necessity of searching for the runway during a critical period of the approach. When visual contact is established the pilot can concentrate on holding the aiming circle on the runway aiming point until the time for flare-out.

An advantage of the invention is that the approach aid assists a pilot to carry out a standard manual landing without risking impairment of the pilot's skill as may be the case when automatic couplers are used. The pilot's actions are practically identical for both V.F.R. (visual flight rules) and instrument landings so that there is no risk of the pilot lacking practice for instrument let-downs.

A particular advantage of the aiming component of the approach aid is that deviations of heading from a straight glide path are shown up immediately in rate form instead of as a displacement, and consequently the pilot is not required to make a mental differentiation of the signal to determine the appropriate course of action.

If desired the approach aid may also be provided with means for including in the visual display a distinctive feature which comes into view at a given altitude. One possible arrangement is a triangle which circumscribes the aiming circle for the last few hundred feet of the descent. This safety height may be set to the ideal altitude at the middle marker. The inclusion of such means, which can be readily operated from the altimeter, is intended to avoid the need for the pilot to look at the control panel during the final approach. Since the indicated airspeed must be held within close tolerances throughout the approach it is desirable to provide means other than on the control panel to keep the pilot informed of the indicated airspeed. This may be done by a further visual display in the field of vision or it may be done aurally, e.g. by adapting an airspeed indicator to read airspeeds at set intervals from recorded discs or tape in a similar fashion to a talking clock, or by varying tones as developed for naval use.

When the invention is employed in military aircraft it can be combined to advantage with an optical gunsight with negligible weight penalty since all basic components of the system are normally fitted to such aircraft.

What is claimed is:

1. An airborne approach aid for a piloted aircraft comprising means on the aircraft for providing directly in the pilot's normal field of vision focussed at infinity and superimposed on the external scene a first display identifying a point, means for adjusting the position of the said display relative to the pilot's eye in accordance with variations of the weight, airspeed and incidence of the aircraft and variations of the direction and speed of the wind whereby a line from the pilot's eye to the said point continuously represents the instantaneous direction of motion of the aircraft relative to the ground, further means on the aircraft for providing a second display superimposed on said first display and in the form of a horizontal line representing the horizon and a vertical line representing a scale of angles subtended at the pilot's eye, means for stabilizing the position of said second display against pitching and rolling of the aircraft whereby said horizontal line becomes coincident with the horizon, means on the aircraft for stabilizing the position of said second display in azimuth whereby said vertical line is maintained at a predetermined orientation from the pilot's eye, and further means on the aircraft similarly providing a third display superimposed on said first display and representing the position of the aircraft in relation to a radio beam such as an I.L.S. beam.

2. An airborne approach aid for a piloted aircraft, comprising an inclined plate of glass or the like disposed in the field of view of the aircraft pilot, a graticule, means for illuminating said graticule and for causing light therefrom to impinge on the inclined plate and reflect to the eye of the pilot, whereby an image of the graticule appears to the pilot superimposed on the external scene, said graticule being such as to provide an image identifying a point, at least one optical deflecting device disposed in the path of light between said graticule and the pilot's eye, airspeed sensing means, vertical speed sensing means, incident airstream sensing means, adjustment means operable by the pilot in accordance with the measure of the weight of the aircraft, other adjustment means operable by the pilot in accordance with wind speed and direction, means for operatively connecting said optical deflecting device with said airspeed sensing means, said vertical speed sensing means, said incident airstream sensing means, said adjustment means and said other adjustment means whereby a line from the pilot's eye to the centre of the image of the said graticule continuously represents the instantaneous direction of motion of the aircraft relative to the ground, a second graticule, means for illuminating said second graticule and for causing light therefrom to impinge on the inclined plate and reflect to the eye of the pilot, whereby an image of the said second graticule appears to the pilot superimposed on the external scene and on the image of the first-mentioned graticule, said second graticule being such as to provide an image comprising a horizontal line and a vertical scale indicating angles subtended at the pilot's eye, further optical deflecting devices disposed in the path of light between the second graticule and the pilot's eye, a gravity erected gyro or like device, means operatively connecting one of said further optical deflecting devices with said gyro or like device whereby the image is stabilized against pitching and rolling movement of the aircraft, a direction gyro or like device, means operatively connecting the other of said further optical deflecting devices with said direction gyro or like device whereby the image may be stabilized in azimuth, and means operable by the pilot for connecting and disconnecting said last-mentioned means.

3. An approach aid according to claim 2, including a further graticule, means for illuminating said further graticule and for causing light therefrom to impinge on the said further optical deflecting devices and on the inclined plate and reflect to the eye of the pilot, whereby an image of the further graticule appears to the pilot superimposed on the external scene and on the image of the second-mentioned graticule, said further graticule being such as to provide an image identifying a point, at least one additional optical deflecting device disposed in the path of light between the further graticule and the pilot's eye but not in the path of light between the second-mentioned graticule and the pilot's eye, radio glide path and localizer signal receiving means, and means operatively connecting said additional optical deflecting device with said radio glide path and localizer signal receiving means whereby the image of the further graticule is caused to deviate from a datum point on the image of the second-mentioned graticule in accordance with displacement of the aircraft from the centre of radio beams received by said signal receiving means.

4. An airborne approach aid according to claim 3 including means operable by the pilot for operating said additional optical deflecting device to provide deviation of the image of the further graticule to a predetermined datum when the aircraft is located at the centre of the beam.

References Cited in the file of this patent
UNITED STATES PATENTS

| | | |
|---|---|---|
| 2,178,637 | Link | Nov. 7, 1939 |
| 2,262,245 | Moseley | Nov. 11, 1941 |
| 2,426,184 | Deloraine | Aug. 26, 1947 |
| 2,495,296 | Springer | Jan. 24, 1950 |
| 2,613,352 | Kellogg | Oct. 7, 1952 |
| 2,738,491 | Michalakis | Mar. 13, 1956 |
| 2,884,829 | Davies | May 5, 1959 |
| 2,887,927 | Newton | May 26, 1959 |